Patented May 30, 1933

1,911,709

UNITED STATES PATENT OFFICE

FRIEDRICH MUTH, OF LEVERKUSEN-I. G.-WERK, GERMANY, ASSIGNOR TO I. G. FARBENINDUSTRIE AKTIENGESELLSCHAFT, OF FRANKFORT-ON-THE-MAIN, GERMANY

NEW SULPHURIZED PHENOL

No Drawing. Application filed June 19, 1931, Serial No. 545,628, and in Germany June 28, 1930.

The present invention relates to a process of preparing tin compounds of non-dyeing high molecular condensation product from a phenol and sulphur the new compounds obtainable thereby.

Non-dyeing high molecular sulphurized derivatives of phenols have been described in literature, for example, in U. S. Patent 1,450,463, in U. S. reissue-Patent 17,940, reissued January 27, 1931, in British Patents 173,313 and 211,108. The thio-derivatives of phenols of the kind referred to are obtainable by heating phenols, such as phenol, naphthol and substitution products thereof, for instance halogen-, alkyl-, hydroxy-, sulphonic- and carboxylic acid derivatives, with sulphur in the presence of an alkali for a prolonged time, and are known to be valuable mordants for basic dyestuffs.

In accordance with my present invention, non-dyeing high molecular condensation products from a phenol and sulphur containing tin in a complex form are obtainable by causing a water soluble inorganic tin compound to react upon a non-dyeing thio-derivative of a phenol of the kind referred to above or of mixtures thereof in aqueous solution. As suitable tin compounds coming into consideration for the purpose of my invention there may be mentioned by way of example, alkali metal stannates, alkali metal sulphostannates, the tin salt of oxalic acid, stannous chloride, or compounds containing tin in a complex form, such as, alkali metal tin oxalates, alkali metal salts of hexachloro stannic acid ($Me_2SnCl_6$).

Instead of starting with a water soluble tin compound the latter may be produced in the reaction mixture from a suitable water insoluble tin compound for example, by introducing stannic chloride into the reaction mixture containing aqueous caustic soda lye, whereby the water soluble sodium stannate is formed.

The ratio of the quantity of the starting thio-derivative of phenol to the water soluble inorganic tin compound depends on the specific thio-derivative of phenol and the specific tin compound used. According to my new process presumably new tin compounds are formed containing the tin in a complex form from which follows that a certain quantity of the tin compound is required for transforming the thio-derivative of phenol into the new complex tin compound; as a general rule there is stated that about 10 to about 20% of tin in the form of a water soluble inorganic compound may be used, calculated on the quantity of the starting thio-derivative of a phenol. I wish it to be understood that the invention is not restricted to the limits herebefore given with regard to the quantity of tin.

The process may be carried out between room temperature and the boiling point of the reaction mixture, and the reaction is complete either immediately after allowing the components to react upon each other or after a short time, say after 1 to 2 hours, the time required depending on the specific starting components and temperatures used. Generally I am working in a neutrally reacting aqueous solution, but the process may be carried out in the same manner in caustic alkali solution.

The new tin compounds can be isolated from the resulting solutions, for example, by acidification, or by evaporation, advantageously in a vacuo, during which a change in the valency of the tin can be effected by blowing in a current of air.

For certain technical purposes a mixture of the sodium salt of a sulphurized phenol of the kind referred to above and of a water soluble inorganic tin salt can likewise be used, formation of the new tin compound occurring on dissolving the composition in water, for example, in a dyeing bath.

The new complex tin compounds of sulphurized phenols are generally greyish to yellowish powders, forming alkali metal salts which are soluble in water, from which solutions they are reprecipitated by the addition of mineral acids. Like the starting thio-derivatives of phenols, the new tin compounds are valuable mordants, possessing the property of becoming fixed from their aqueous solutions on cellulosic fibres and of fixing basic dyestuffs thereon, some of the new compounds besides possessing the property of reserving wool in the dyeing of mixed fabrics.

The invention is illustrated by the following examples, without being limited thereto:

*Example 1:*—62 parts by weight of the product obtainable according to the example of the U. S. reissue-Patent 17,940 reissued January 27, 1931, are dissolved in hot water and an excess of aqueous caustic soda lye, and an aqueous solution of 56 parts by weight of crystallized stannous chloride is dropped in. Sufficient caustic soda should be present to dissolve completely the hydroxide formed. The mass is kept for one hour on a boiling water bath, filtered and acidified with dilute hydrochloric acid. The precipitate produced is filtered off with suction, washed well with dilute hydrochloric acid and water, redissolved in water by means of exactly the sufficient quantity of caustic soda and evaporated to dryness in a vacuo. The reaction product is a grey powder.

*Example 2:*—62 parts by weight of a product obtainable in accordance with Example 2 of German Patent No. 400242 are caused to react with 65 parts by weight of stannic chloride, and the reaction mixture is worked up in the manner described in Example 1. The reaction product is a yellowish brown resin.

The starting thio-derivative of phenol is prepared by dissolving 38 parts by weight of phenol with 16 parts by weight of caustic soda in 40 parts by weight of water, adding thereto 20 parts by weight of pulverized sulphur and heating for 30 to 40 hours at 180 to 190° C. under reflux condenser. The viscous mass is diluted with water, the sulphurized phenol is precipitated from the solution by the addition of hydrochloric acid, the precipitate is dissolved in dilute aqueous sodium carbonate solution, and the sodium salt is salted out from the solution by the addition of Glauber's salt.

*Example 3:*—50 parts by weight of a sulphurized phenol, obtainable in accordance with the example of German Patent No. 409,782, are dissolved in water with the addition of caustic soda, and to the solution there are added in small portions 20 parts by weight of potassium hexachloro stannate. The solution is stirred for about 4 hours at water bath temperature and is worked up as described in Example 1. A brownish, readily pulverizable resin is obtained.

The starting sulphurized phenol is prepared by dissolving 38 parts by weight of phenol with 10 parts by weight of water and 22 parts by weight of aqueous caustic soda lye of 38° Bé, adding thereto 26 parts by weight of pulverized sulphur and boiling for about 30 hours under reflux condenser. The working up is effected as described for the product of Example 2 of German Patent No. 400,242 (see Example 2).

*Example 4:*—50 parts by weight of a sulphurized phenol, obtainable by melting 2 mols of phenol, ½ mol of caustic soda and 4 mols of sulphur for about 8 hours at a temperature between 160–180° C., are dissolved in water and a sufficient quantity of caustic soda; to the solution there are added 15 parts by weight of finely powdered tin oxalate in small portions, and the whole is stirred for 12 hours at room temperature. The solution is filtered and evaporated to dryness in a vacuo; a yellowish brown powder is obtained.

*Example 5:*—50 parts by weight of a product, obtainable according to the example of the U. S. reissue-Patent 17,940, reissued January 27, 1931, are dissolved as the sodium salt in about 500 parts of water, 14 parts by weight of crystallized sodium stannate are added, and the whole is stirred for 20 minutes in a boiling water bath, then filtered with suction and evaporated to dryness in a vacuo. The resulting product possesses properties analogous to those of the product of Example 2.

*Example 6:*—100 parts by weight of sulphurized phenol, obtainable by melting together 2 mols of phenol, 1 mol of calcium oxide, 4 to 5 mols of finely divided sulphur in aqueous suspension for 30 to 50 hours on a boiling water bath and converting the calcium salt into the sodium salt by means of sodium carbonate, are dissolved in 400 parts by weight of water, thereto 28 parts by weight of sodium stannate are added, and the whole is evaporated to dryness in a vacuo. Thus is obtained a brittle brownish resin, soluble in water from which solution it is reprecipitated by the addition of a mineral acid and is not reprecipitated by the addition of acetic acid, and possessing the property of reserving wool against the taking up of substantive dyestuffs in the dyeing of mixed fabrics. When working with a larger quantity of sodium stannate, up to 40 parts by weight, a product exerting similar properties is obtained, while, when using less than 28 parts by weight or more than 40 parts by weight of sodium stannate the reserving effect of the resulting tin compound is distinctly decreased.

*Example 7:*—50 parts by weight of the sodium salt of the phenol sulphur resin described by Haittinger in Monatshefte für Chemie, vol. 4, page 166, are dissolved in 300 parts by weight of water, 18 parts by weight of crystallized sodium stannate are added, the solution is filtered and evaporated to dryness in a vacuo. A brownish resin like product results.

I claim:

1. The process which comprises reacting upon a non-dyeing high molecular condensation product from a phenol and sulphur with a water soluble inorganic tin compound in aqueous solution.

2. The process which comprises reacting upon a non-dyeing high molecular condensation product from a phenol and sulphur with a water soluble inorganic tin compound in a quantity corresponding to about 10 to about 20% of tin, calculated on the amount of the starting thio-derivative of a phenol, in aqueous solution.

3. The process which comprises reacting upon a non-dyeing high molecular condensation product from a phenol and sulphur with sodium stannate in aqueous solution.

4. The process which comprises reacting upon a non-dyeing high molecular condensation product from a phenol and sulphur with sodium stannate in a quantity corresponding to about 10 to about 20% of tin, calculated on the amount of the starting thio-derivative of a phenol, in aqueous solution.

5. The process which comprises reacting upon a non-dyeing high molecular condensation product from phenol and sulphur with a water soluble inorganic tin compound in aqueous solution.

6. The process which comprises reacting upon a non-dyeing high molecular condensation product from phenol and sulphur with a water soluble inorganic tin compound in a quantity corresponding to about 10 to about 20% of tin, calculated on the amount of the starting thio-derivative of phenol, in aqueous solution.

7. The process which comprises reacting upon a non-dyeing high molecular condensation product from phenol and sulphur with sodium stannate in aqeuous solution.

8. The process which comprises reacting upon a non-dyeing high molecular condensation product from phenol and sulphur with sodium stannate in a quantity corresponding to about 10 to about 20% of tin, calculated on the amount of the starting thio-derivative of phenol, in aqueous solution.

9. The process which comprises dissolving 100 parts by weight of a sulphurized phenol prepared by melting together 2 mols of phenol, 1 mol of calcium oxide, 4 to 5 mols of finely divided sulphur in aqueous suspension for 30 to 50 hours on the boiling water bath and converting the calcium salt into the sodium salt, in 400 parts by weight of water, adding thereto 28 parts by weight of sodium stannate and evaporating to dryness in a vacuo.

10. As new products non-dyeing high molecular condensation products from phenols and tin containing tin in a complex form, forming alkali metal salts which are generally greyish to yellowish powders, soluble in water, being precipitated from their aqueous solutions by the addition of mineral acids and being valuable mordants for basic dyestuffs, some of them possessing the property of preserving wool against the taking up of substantive dyestuffs in the dyeing of mixed fabrics.

11. As a new product the non-dyeing high molecular phenol sulphur condensation product containing tin in a complex form obtainable in accordance with the process as claimed in claim 9, forming alkali metal salts which are brittle brownish resins and which are soluble in water, being reprecipitated from its aqueous solutions by the addition of mineral acid, but being not reprecipitated therefrom by the addition of acetic acid, being a valuable mordant for basic dyestuffs and possessing the property of reserving wool against the taking up of substantive dyestuffs in the dyeing of mixed fabrics.

In testimony whereof, I affix my signature.
FRIEDRICH MUTH.